(12) United States Patent
Deck et al.

(10) Patent No.: US 6,900,610 B2
(45) Date of Patent: May 31, 2005

(54) APPARATUS, METHODS, AND ARTICLES OF MANUFACTURE FOR A TERMINATOR POSITIONING SYSTEM

(75) Inventors: Gary L. Deck, Bethel, PA (US); Douglas S. Pfautz, Landisville, PA (US); Keith L. Nicholas, Harrisburg, PA (US)

(73) Assignee: Tyco Electronics Corporation, Middletown, PA (US)

( * ) Notice: Subject to any disclaimer, the term of this patent is extended or adjusted under 35 U.S.C. 154(b) by 162 days.

(21) Appl. No.: 10/441,386

(22) Filed: May 20, 2003

(65) Prior Publication Data

US 2004/0232871 A1 Nov. 25, 2004

(51) Int. Cl.$^7$ ............ G05B 1/06; F16H 37/12; H01C 17/28
(52) U.S. Cl. ............ 318/652; 74/52; 74/137; 74/140; 74/141; 29/619; 29/621; 29/837; 29/857; 29/33 M; 29/748
(58) Field of Search ............ 74/52, 592, 96, 74/97.1, 140, 141, 110, 97.2, 99 R, 137, 100.1, 100.2; 29/619, 621, 857, 33 M; 318/652, 560, 626, 653, 657

(56) References Cited

U.S. PATENT DOCUMENTS

| 4,019,362 | A | * | 4/1977 | McKeever ............ 72/421 |
|---|---|---|---|---|
| 4,748,393 | A | * | 5/1988 | Fincher et al. ............ 318/638 |
| 4,848,349 | A | * | 7/1989 | Sherman et al. ............ 600/312 |
| 5,490,316 | A | * | 2/1996 | Kimoto ............ 29/564.4 |
| 5,543,696 | A | * | 8/1996 | Huggett et al. ............ 318/590 |
| 5,784,770 | A | * | 7/1998 | Long et al. ............ 29/564.4 |
| 5,903,971 | A | * | 5/1999 | Ishiwata et al. ............ 29/748 |
| 5,973,470 | A | * | 10/1999 | Degroote ............ 318/632 |
| 6,649,111 | B2 | * | 11/2003 | Hannewald et al. ............ 264/278 |
| 6,782,607 | B2 | * | 8/2004 | Pfautz et al. ............ 29/745 |
| 2002/0023347 | A1 | * | 2/2002 | Hannewald et al. ... 29/890.124 |
| 2002/0046450 | A1 | * | 4/2002 | Odashima et al. ............ 29/25.01 |

FOREIGN PATENT DOCUMENTS

EP  1480319 A2 * 11/2004 ............ H02K/41/03

* cited by examiner

Primary Examiner—David Martin
Assistant Examiner—Patrick Miller

(57) ABSTRACT

The invention is a system for controlling the position of a movable member moved by a prime mover by monitoring the position of the movable member; generating position information based upon this monitoring; and controlling the prime mover based upon the position information by providing a counter force to the movable member substantially equal to an opposing force opposing the movement of the movable member. The invention may include a movable member, such as a ram used for fastening a terminal to a wire; a spring; a DC planetary gear motor for providing a force to the movable member opposing the spring; a position detector, such as an linear voltage displacement transducer, to detect the position of the movable member and generate position information; and a controller, which may include a logic board or microprocessor and memory, for controlling the force from the motor in response to the position information.

11 Claims, 6 Drawing Sheets

APPARATUS, METHODS, AND ARTICLES OF MANUFACTURE FOR A TERMINATOR POSITIONING SYSTEM

BACKGROUND

The field of the invention is positioning systems. More particularly, the field of the invention is positioning systems utilizing a linear voltage displacement transducer and a DC planetary gear motor.

There are numerous machines where a member is cyclically driven and it is required to stop the member at a precise location within its positional cycle. One such type of machine is a terminating unit, which is utilized repetitively to attach terminals to the end of one or more wires, such as those used in power distribution and communications. These units typically incorporate a motor that is attached via a mechanical linkage to a movable member, such as a vertical ram. The mechanical linkage transforms the rotary motion of the motor to the linear motion of the ram, which provides the required force for crimping the terminal to the wire. During this process, it is often necessary to momentarily hold the ram in a desired position using a positioning system. For example, it may be desirable to hold the ram near the bottom of its cycle so that a wire may be placed within the connector for termination.

Methods of holding a desired position on a terminating unit typically rely on limit switches, rotary encoders or resolvers to monitor the rotational position of the motor. Systems of this type either turn the motor off at the desired position, using system friction to maintain the desired position or using a bi-directional motor system that reverses the drive of the motor to hold the ram in position. For example, a single cycle positioning system may be used that incorporates a three phase induction motor having a three phase inverter and a microprocessor for controlling the inverter to generate three phase power. Pulse width modulation techniques are utilized along with start, stop, and direction signals to control the forward or backward force applied to the ram.

The use of such systems to control positioning may be costly and can be unreliable. Also, indirect monitoring of the ram by monitoring the rotation of the motor may lead to positional inaccuracies imparted by the mechanical link between the motor and the ram. Accordingly, an improved system is needed.

SUMMARY OF THE INVENTION

Embodiments of the invention include apparatus, methods, and articles of manufacture for controlling the position of a movable member moved by a prime mover by monitoring the position of the movable member; generating position information based upon this monitoring; and controlling the prime mover based upon the position information by providing a counter force to the movable member substantially equal to an opposing force opposing movement of the movable member.

These embodiments may be used in a terminal positioning system that incorporates a movable member, such as a ram, for fastening a terminal to a wire; a spring; a DC planetary gear motor for providing a force to the movable member opposing the spring; a position detector, such as an linear voltage displacement transducer, to detect the position of the movable member and generate position information; and a controller, which may include a logic board or microprocessor and memory, for controlling the force from the motor in response to the position information.

DETAILED DESCRIPTION

The invention will be understood more fully from the detailed description given below and from the accompanying drawings of the preferred embodiments of the invention; which, however, should not be taken to limit the invention to a specific embodiment but are for explanation and understanding only.

Figure 1:
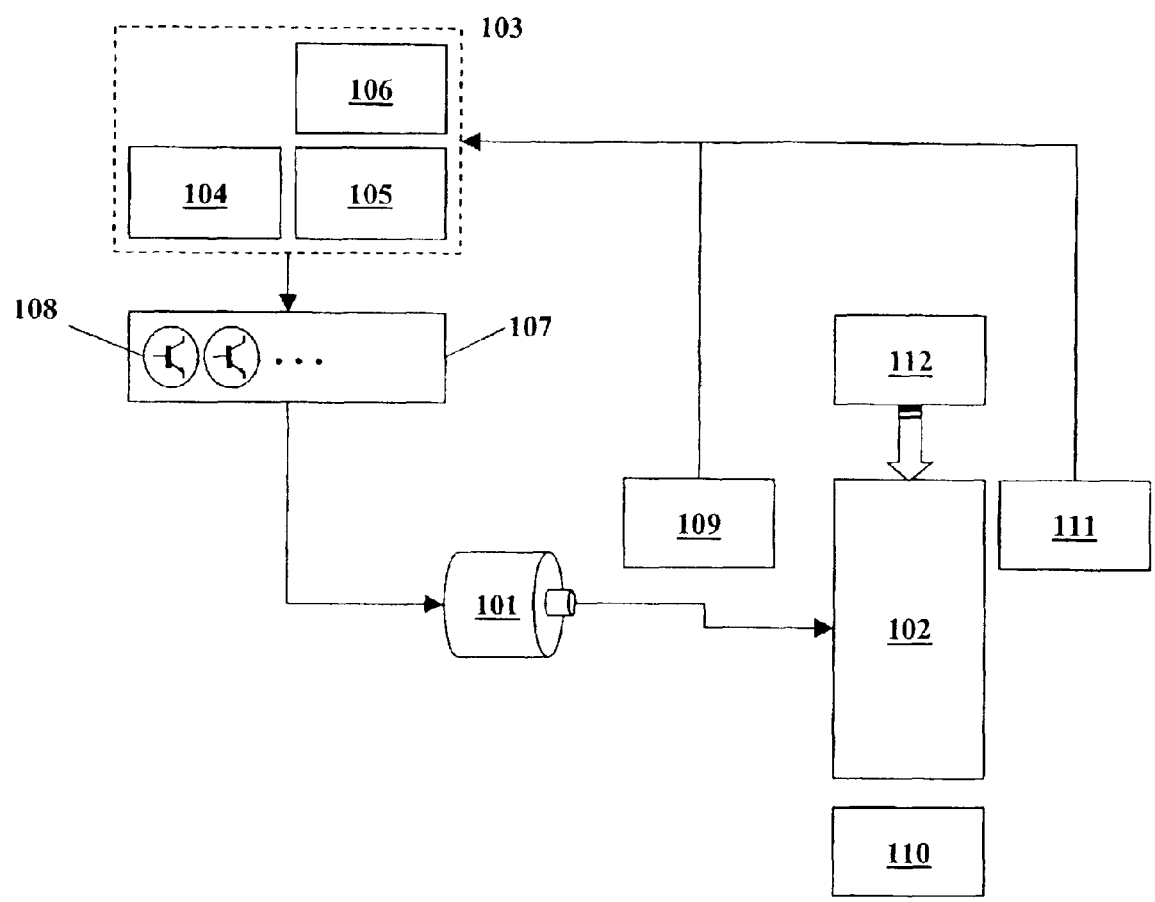
FIG. 1 illustrates a preferred embodiment of a positioning system.

FIG. 1 is a diagram illustrating preferred embodiment of the invention in a positioning system. The positioning system in this example is a terminator system for terminating wires, but is not limited thereto. A prime mover (101), such as a DC planetary gear motor, is utilized in this exemplary embodiment of a positioning system to provide torque to drive a movable member (102) for the purpose of delivering a force, such as is used to crimp a terminal to the end of a length of wire.

Prime mover (101) is controlled by controller (103). Controller (103) is not particularly limited and may comprise any combination of electrical components capable of controlling the operation of the positioning system in accordance with the invention. In the embodiment disclosed herein, controller (103) includes microprocessor (104), which utilizes a program or algorithm stored in memory (105) to provide controlling signals to prime mover (101). Controller (103) may also comprise other system capable of functioning in a similar manner, such as a logic circuit formed on a logic board using standard or integrated components. Memory (105) may comprise any memory storage system, such as RAM, SRAM, DRAM, and the like, formed as a PROM, EPROM, or EEPROM, for example. All of controller (103) may also be formed as an integrated circuit in this, or a like, manner.

Controller system (103) may receive a variety of positional feedback information on prime mover (101) and moveable member (102), such as through digital and/or analog inputs, e.g. analog to digital ("A/D") converter (106), and uses this positional feedback information to determine the correct parameters for controlling prime mover (101), and hence movable member (102), and outputs signals to prime mover (101) based thereon. For example, microprocessor (104) may use these input signals to generate a pulse width modulated (PWM) control signal that serves as the input to a transistor switch arrangement (107). The transistors (108) of transistor switch arrangement (107) are arranged in a manner that permits operation of the motor in only one direction, and also provides dynamic braking capability.

Figure 2:
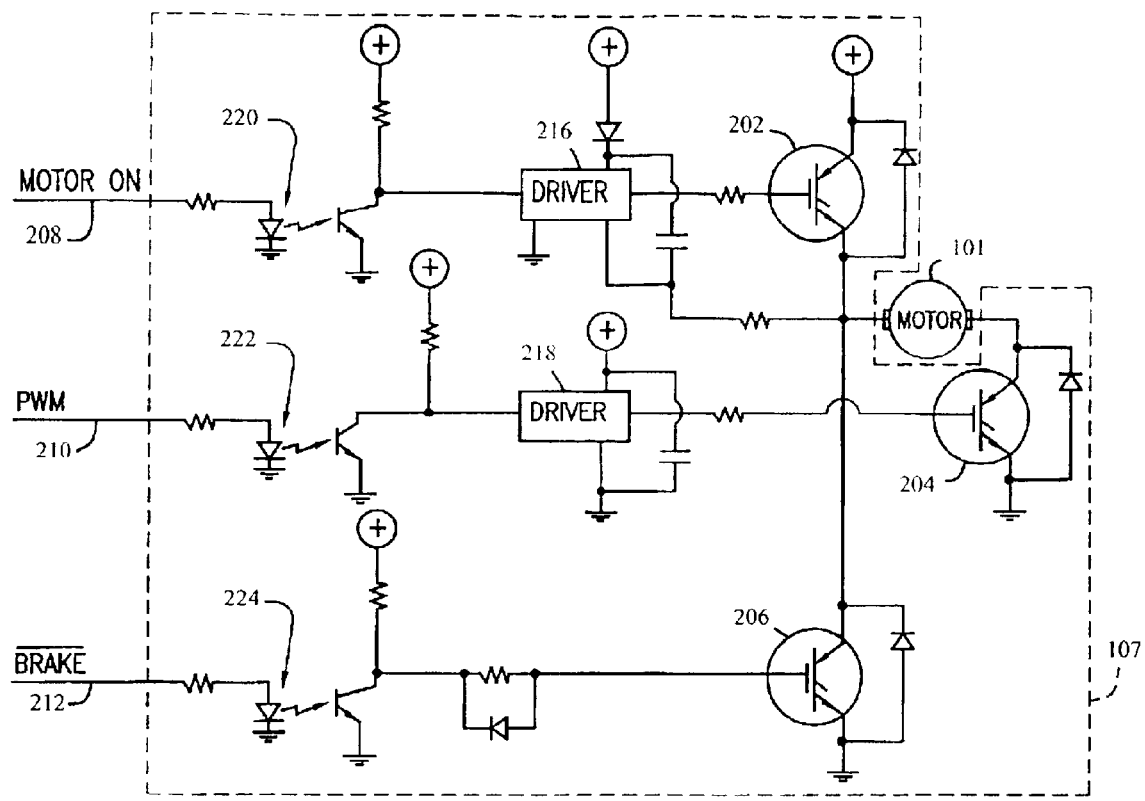
FIG. 2 illustrates a preferred embodiment of a transistor switch arrangement.

One preferred embodiment of transistor switch arrangement (107) is shown in FIG. 2. As shown in FIG. 2, control of prime mover (101) is effected through three semiconductor switches (202), (204), and (206), each of which is illustratively an insulated gate bipolar transistor (IGBT). The switches (202) and (204) are connected in a half "H-bridge" configuration to control the running of prime mover (101), and the switch (206) is connected to provide a means for dynamic braking of prime mover (101). The control signals over the leads (208), (210) and (212) from the controller (103) are optically isolated from the drivers (216) and (218) for the switches (202) and (204) by the opto-isolators (220) and (222), respectively. The switch (206) is driven directly from the opto-isolator (224), in response to a signal over the lead (212). Thus, as shown, a winding of prime mover (101) has a first end, which can be connected to a DC power source through the switch (202); and a second end, which can be connected to ground through the switch (204). The brake switch (206) provides a path to ground for the first end of the winding of prime mover (101). (It will be appreciated that a different reference level may also be selected in place of ground.)

Positional feedback information for the system may be provided using any number of means. For example, one or more sensors (109) may be used to detect the position of movable member (102). In the preferred embodiment sensor (109) is a Hall-effect sensor, which provides an input signal back to controller (103).

A typical cycle for this embodiment consists of one complete revolution, where the movable member starts at a Top Dead Center ("TDC") position, continues to a bottom position, and then returns back to the TDC position. In this embodiment, movable member (102) incorporates a ram, which is used to apply force to a terminal connector, crimping the connector around the wire to be terminated and securing the termination. This may occur when the movable member (102) is near the bottom position. A force is delivered to the terminator, pressing it against crimping mechanism (110) to cause the terminal to be pressed to the end of a wire. Sensor (109) is used by controller (103) to properly adjust the application of the PWM power signals to prime mover (101) in synchronization with the movement of movable member (102). Hall effect sensor (109) indirectly detects the TDC position of movable member (102) by monitoring the position of the mechanical linkage between movable member (102) and prime mover (101).

When using certain types of terminals, for example closed barrel terminals, it is desirable to temporarily stop movable member (102) prior to reaching the bottom motion of the terminator ram to allow placement of the wire inside the wire barrel. In this mode of operation, movable member (102) and prime mover (101) must be properly controlled to hold the terminal product motionless during this operation. Once the wire is properly positioned within the terminator connector, prime mover (101) continues the movement of movable member (102) and the mechanical cycle is completed—resulting in the attachment of the terminal to the wire.

A position monitor (111) is thus preferably incorporated into the system to permit monitoring of the position of movable member (102) as it nears the bottom portion of the cycle. Position monitor (111) provides precise feedback information to controller (103) on the position and motion of movable member (102). In the preferred embodiment, position monitor (111) incorporates a linear voltage displacement transducer (LVDT), which provides an output voltage that varies with the displacement of movable member (102).

The linear voltage displacement transducer of position monitor (111) preferably provides an input signal to A/D converter (106). A/D converter (106) then converts the analog signal from position monitor (111) to a digital signal for interpretation by microprocessor (104) of controller (103). The positional information derived from this digital feedback information is then preferably used to adjust the PWM control signal to transistor switch arrangement (107) in order to modify the torque provided by prime mover (101) to moveable member (102) to hold it in the desired position.

In a preferred embodiment, the prime mover (101) is unidirectional, which provides significant cost savings over bi-directional systems. In this embodiment, it is preferred that an opposing force mechanism (112) be further included to provide a counter force to movable member (102) as a means for correcting any overshoot of the desired position of moveable member (102). Opposing force mechanism (112) is not particularly limited, and may comprise a spring, for example.

Controller (103) monitors the position of movable member (102) and applies PWM signals to transistors (108) of transistor arrangement (107) to generate an equivalent motor torque to generate a substantially equal counter force to opposing force mechanism (112) as movable member (102) nears the bottom portion of its cycle. The effect of this torque is that movable member (102) is held in a stable position at this point without the need for a bi-directional motor system, and enables the wire to be placed into the wire barrel.

Figure 3:
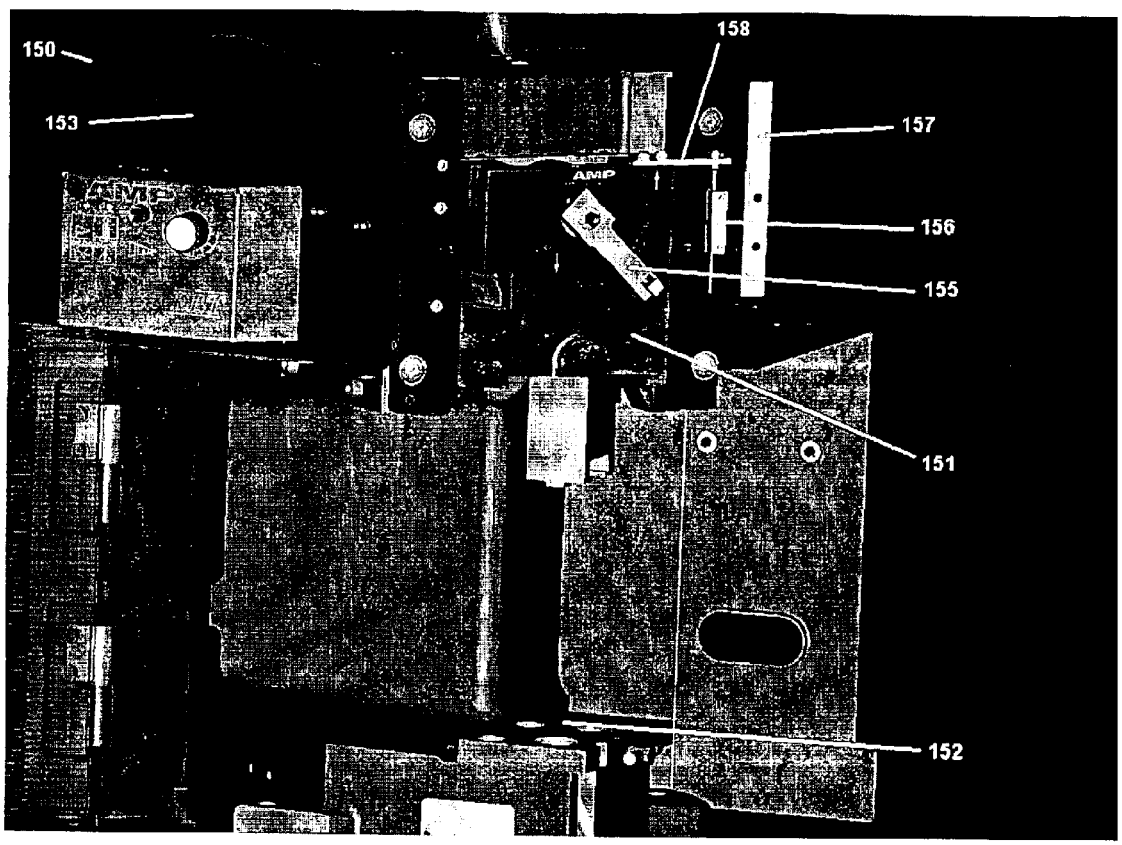
FIG. 3 illustrates a preferred embodiment of a terminating unit.

FIG. 3 is a drawing illustrating a preferred embodiment of a complete terminating unit incorporating the invention. Terminating unit (150) includes ram (151), which is forced toward block (152). A terminal applicator (crimping mechanism, not shown) is placed in the space between ram (151) and block (152). The terminal applicator is acted upon by the ram (151) to crimp a terminal connector onto a wire. Individual terminals are fed into the terminal applicator, and a wire end is placed within the terminal applicator mechanism. The terminal connector is crimped to the wire to effect the termination. DC planetary gear motor (153) is used to drive ram (151) against the force of the opposing spring, located in the terminal applicator (crimping mechanism, not shown) and the terminal being crimped.

The height of the finished termination may be adjusted by adjuster arm (155). Interchangeable terminal applicators (not shown) may be placed in the space between drive ram (151) and block (152). Along with adjustment of adjuster arm (155), interchangable applicators enable terminating unit (150) to be used with different sized terminals. LVDT (156) is connected to ram (151) via LVDT actuator (158). LVDT (156) is preferably enclosed behind cover (157). Terminating unit (150) is controlled by controller (103) as previously described (controller not shown in view).

In operation, a unidirectional DC planetary gear motor (153) drives ram (151), the movement of which is opposed by spring contained within the terminal applicator. DC planetary gear motor (153) operates by receiving PWM power control signals from controller, as previously described. As ram (151) moves through its cycle, it displaces LVDT actuator (158). The displacement of the LVDT actuator (158) imposes a similar displacement on LVDT (156), which causes a change in the output voltage of LVDT (156). The output voltage from LVDT (156) is detected by controller (103).

As ram (151) reaches a predetermined position near the bottom of its cycle, as detected by controller (103) through the signals received from LVDT (156), controller (103) adjusts the PWM signals to DC planetary gear motor (153) so that it only supplies sufficient torque to generate a counter force on ram (151) to substantially equally oppose spring forces within the terminal applicator, momentarily holding ram (151) in the desired position as the terminal is inserted into the aforementioned space. After receipt of a signal from the operator, controller (103), then again controls the PWM signal to DC planetary gear motor (153), allowing ram (151) to continue its cycle.

Figure 4A:
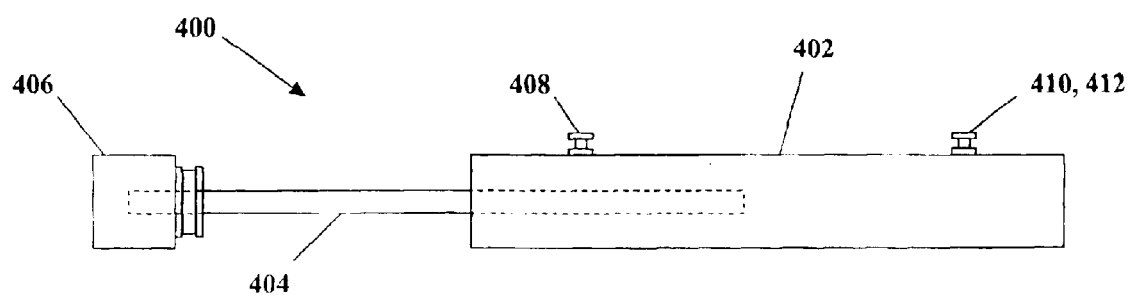
FIG. 4(a)–(c) illustrate a preferred embodiment of an LVDT.
Figure 4B:
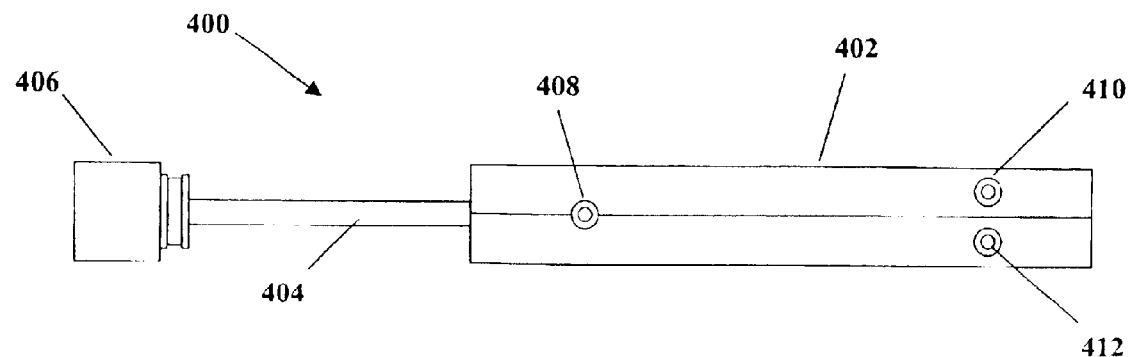
Figure 4C:
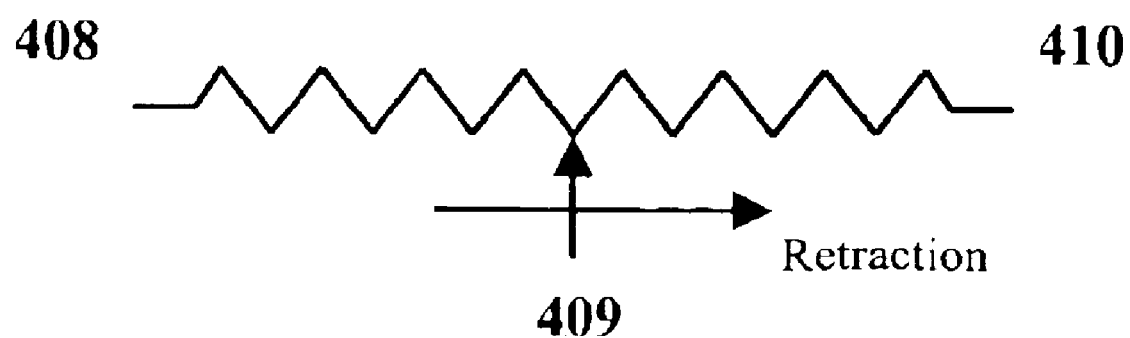

LVDT (156) is not particularly limited and may comprise any LVDT capable of performing in the manner of the invention. An example of one such LVDT is illustrated in FIGS. 4(a)–(c). In this embodiment, LVDT includes actuator casing (402), having moveable piston shaft (404) inserted therein. An opposite end of moveable shaft (404) may or may not be fitted with an end cap (406). Terminals (408, 410, and 412) are electrically connected to wire the LVDT in the manner shown in FIG. 4(c). LVDT (400) may be mechanically connected to ram (151) via LVDT actuator (158), as shown in FIG. 3.

In operation, LVDT (400) operates as a linear motion potentiometer. Shaft (404) moves linearly within casing (402) in proportion to the movement of ram (151) by way of linear actuator (158). As shaft (404) moves within casing (402), it reduces (during retraction) and increases (during expansion) the resistance across the terminals of LVDT (400), thus producing an output voltage that is substantially linearly related to the position of ram (151).

While LVDT (400) is not limited, it preferably has a standard resistance of between about 500Ω and 20 kΩ, with a resistance tolerance of about ±20%. The preferred power rating is between about 0.2 and 1.2 watts, although not limited thereto. The stroke of shaft (404) is preferably between about ½" and 4". Shaft (404) may have a variety of shaped ends, such as the plain facing shown, or threaded, chamfered, etc. Additionally, the exposed portion of piston (shaft (404) may contain a spring to help return the shaft to its extended position.

Preferred embodiments of the invention thus preferably utilize a linear sensing method to directly monitor the absolute position of the vertical ram. Direct monitoring of the position of the ram has the significant advantage that it removes any positional inaccuracies that may be imparted by the mechanical link between the motor and the ram. Additionally, preferred embodiments preferably utilize the inherent opposing force available in terminal applicators to assist in maintaining a desired position within the vertical motion of the ram. Using the opposing force of the applicator also permits the use of a lower cost unidirectional motor system.

Although this invention has been described with reference to particular embodiments, it will be appreciated that many variations will be resorted to without departing from the spirit and scope of this invention as set forth in the appended claims.

What is claimed is:

1. An apparatus for controlling the position of a movable member moved by a prime mover, said apparatus comprising:
   a position monitor for monitoring said position of said movable member and generating position information thereon;
   a controller programmed for controlling said prime mover based upon said position information; and
   an opposing force actuator providing an opposing force to said movable member opposing said prime mover; and
   wherein said controller is programmed for providing a counter force to said movable member substantially equal to said opposing force,
   wherein said movable member is a ram for applying force to an applicator for terminating a terminal onto a wire.

2. The apparatus of claim 1, wherein said prime mover comprises a motor.

3. The apparatus of claim 1, wherein said prime mover comprises a DC planetary gear motor.

4. The apparatus of claim 1, wherein said controller comprises one or more selected from the group consisting of a logic circuit, a microprocessor, and memory.

5. The apparatus of claim 1, wherein said position monitor comprises a Linear Voltage Displacement Transducer (LVDT) and said controller further comprises an Analog to Digital converter for receiving an input signal from said LVDT.

6. A terminator positioning system comprising:
   a movable member for applying force to an applicator for fastening a terminal to a wire, the applicator containing a spring for providing a spring force on said movable member;
   a motor for providing a motor force to said movable member opposing said spring force;
   a position detector to detect the position of said movable member and generate position information; and
   a controller for controlling said motor force from said motor in response to said position information.

7. The apparatus of claim 6, wherein said motor comprises a DC planetary gear motor.

8. The apparatus of claim 6, wherein said controller comprises one or more selected from the group consisting of a logic circuit, a microprocessor, and memory.

9. The apparatus of claim 6, wherein said position monitor comprises a Linear Voltage Displacement Transducer (LVDT) and said controller further comprises an Analog to Digital converter for receiving an input signal from said LVDT.

10. A method for controlling the position of a movable member moved by a prime mover comprising the steps of:
    monitoring said position of said movable member;
    generating position information based upon said monitoring; and
    controlling said prime mover based upon said position information by providing a counter force to said movable member substantially equal to an opposing force opposing movement of said movable member,
    wherein said movable member is a ram for applying force to an applicator for terminating a terminal onto a wire.

11. The method of claim 10, further comprising the steps of:
    providing the opposing force to said movable member opposing said prime mover; and
    providing the counter force to said movable member substantially equal to said opposing force.

\* \* \* \* \*